US008867618B2

(12) United States Patent
Pandit et al.

(10) Patent No.: US 8,867,618 B2
(45) Date of Patent: *Oct. 21, 2014

(54) METHOD AND APPARATUS FOR WEIGHTED PREDICTION FOR SCALABLE VIDEO CODING

(75) Inventors: Purvin Bibhas Pandit, Franklin Park, NJ (US); Jill MacDonald Boyce, Manalapan, NJ (US); Peng Yin, West Windsor, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1714 days.

This patent is subject to a terminal disclaimer.

(21) Appl. No.: 11/989,173

(22) PCT Filed: May 31, 2006

(86) PCT No.: PCT/US2006/021039
§ 371 (c)(1),
(2), (4) Date: Jan. 22, 2008

(87) PCT Pub. No.: WO2007/018688
PCT Pub. Date: Feb. 15, 2007

(65) Prior Publication Data
US 2009/0129474 A1 May 21, 2009

Related U.S. Application Data

(60) Provisional application No. 60/702,101, filed on Jul. 22, 2005.

(51) Int. Cl.
*H04N 11/02* (2006.01)
*H04N 7/12* (2006.01)
*H04N 19/51* (2014.01)
*H04N 19/577* (2014.01)
*H04N 19/36* (2014.01)

(52) U.S. Cl.
CPC ... *H04N 19/00721* (2013.01); *H04N 19/00587* (2013.01); *H04N 19/00448* (2013.01)
USPC .................. 375/240.16; 375/240; 375/240.12

(58) Field of Classification Search
USPC ................................ 375/240, 240.12, 240.16
See application file for complete search history.

(56) References Cited

U.S. PATENT DOCUMENTS

| 6,510,177 B1* | 1/2003 | De Bonet et al. ........ 375/240.16 |
| 2006/0133486 A1* | 6/2006 | Boyce ...................... 375/240.12 |

(Continued)

OTHER PUBLICATIONS

IEEE, "Weighted Prediction in the H.264/MPEG AVC Video Coding Standard", Jill M. Boyce, May 23, 2004.*

(Continued)

*Primary Examiner* — Un C Cho
*Assistant Examiner* — Siming Liu
(74) *Attorney, Agent, or Firm* — Robert D. Shedd; Julia Tanase

(57) ABSTRACT

There are provided scalable video encoders, scalable video decoders, and corresponding scalable video encoding and decoding methods. A scalable video encoder includes an encoder for encoding a block in an enhancement layer of a picture by using a motion vector that corresponds to a block in a lower layer of the picture as a motion vector predictor for the block in the enhancement layer, and using a weighting parameter that was applied to a particular lower layer reference picture to encode the block in the lower layer for motion compensation of the block in the enhancement layer. The block in the enhancement layer corresponds to the block in the lower layer.

16 Claims, 6 Drawing Sheets

(56) References Cited

U.S. PATENT DOCUMENTS

| | | | |
|---|---|---|---|
| 2006/0153295 A1* | 7/2006 | Wang et al. | 375/240.08 |
| 2006/0215762 A1* | 9/2006 | Han et al. | 375/240.16 |
| 2006/0245498 A1* | 11/2006 | Lee et al. | 375/240.16 |
| 2006/0291562 A1* | 12/2006 | Lee et al. | 375/240.16 |

OTHER PUBLICATIONS

Boyce, J.: "Weighted prediction in the H.264/MPEG AVC video coding standard" Circuits and Systems, 2004. ISACs '04. Proceedings of the 2004 International Symposium at Vacouver, BC, Canada, May 23-26, 2004, Piscataway, NJ, USA, IEEE, US. May 23, 2004, pp. III-789-792, XP010719383.

Lee, K.; "Extension of weighted prediction to multi layer structure" Joint Video Team (JVT) of ISO/IEC MPEG & ITU-T VCEG (ISO/IEC JTC1/SC29/WG11 and ITU-T SG16 Q.6), Document: JVT-P076, (online) Jul. 19, 2005, XP002399725.

Reichel, J. et al..: "Joint Scalable Video Model JSVM-2" Joint Video Team (JVT) of ISO/IEC MPEG & ITU-T VCEG (ISO/IEC JTC1/SC29/WG11 and ITU-T SG16 Q.6), Document: JVT-O202, Apr. 16, 2005, pp. 1-31, XP002399745.

Reichel, J. et al.: "Scalable Video Coding—Working Draft 2", Joint Video Team (JVT) of ISO/IEC MPEG & ITU-T VCEG (ISO/IEC JTC1/SC29/WG11 and ITU-T SG16 Q.6) Document: JVT-O202, Apr. 16, 2005, pp. 1-134.

Yin, P. et al.: "Weighted Prediction in SVC" Joint Video Team (JVT) of ISO/IEC MPEG & ITU-T VCEG (ISO/IEC JTC1/SC29/WG11 and ITU-T SG16 Q.6), Document: JVT-P064, (online), Jul. 21, 2005, XP002399866.

Internet Document: "Index of /av-arch/jvt-site/2005_07_Poznan" ITU-T, [Online] XP002399726 Retrieved from the Internet: URL:http://ftp3.itu.int/av-arch/jvt-site/2 005_07_Pozan/> [retrieved on Sep. 20, 2006].

Apache HTTP server, version 1.3.26, retrieved from http://svn.apache.org/viewc/httpd/httpd/branches/1.3.x/src/modules/standard/mod_autoindex.c?revision93919 [retrieved on Nov. 30, 2006].

Open, Open Group Base Specification Issue 6, IEEE Std 1003.1, 2004, retrieved from http://www.opengroup.org/onlinepubs/009695399/functions/open.html [retrieved on Nov. 30, 2006].

\* cited by examiner

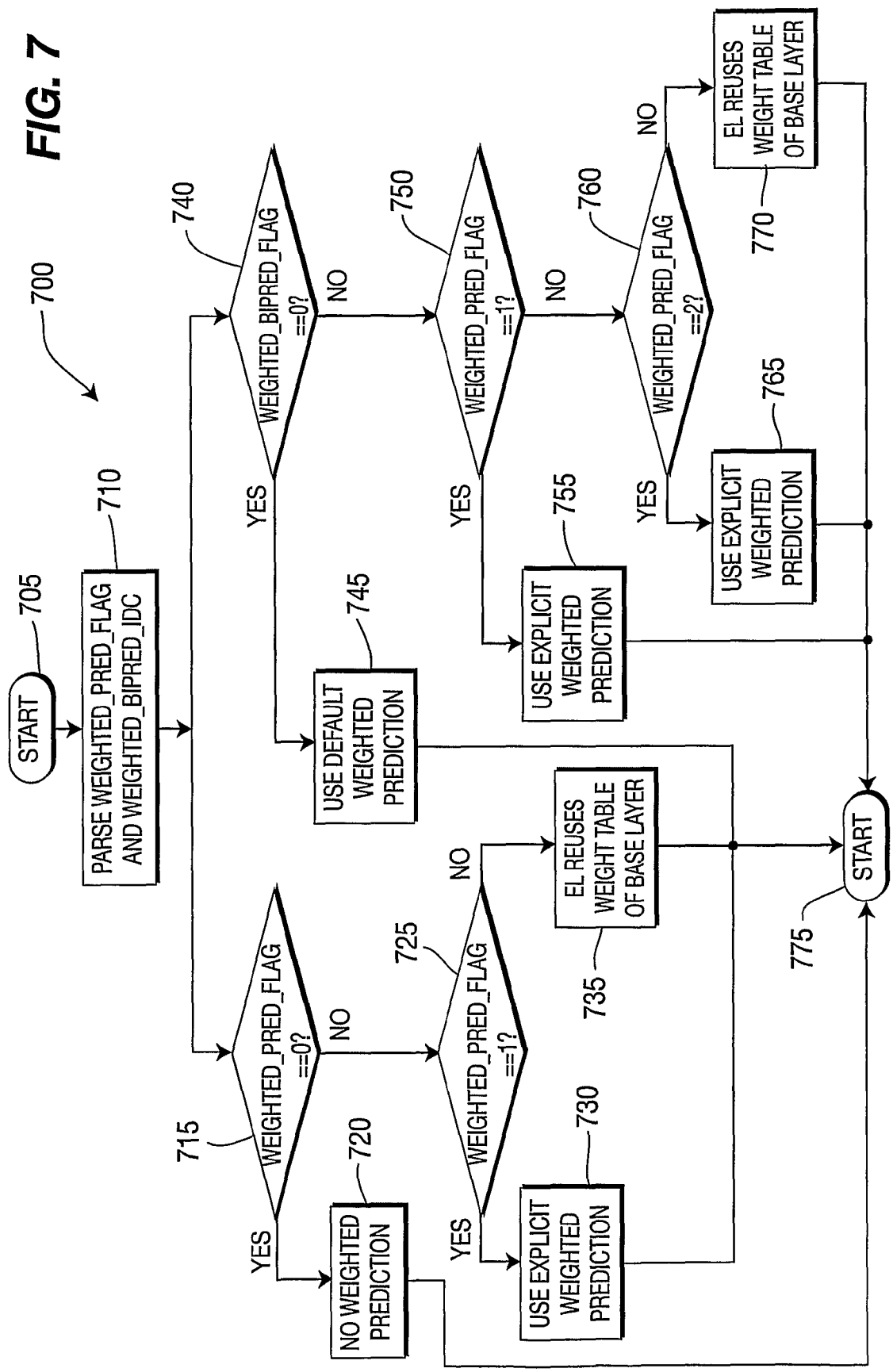

METHOD AND APPARATUS FOR WEIGHTED PREDICTION FOR SCALABLE VIDEO CODING

CROSS-REFERENCE TO RELATED APPLICATIONS

This application claims the benefit, under 35 U.S.C. §365 of International Application PCT/US2006/021039, filed May 31, 2006, which was published in accordance with PCT Article 21(2) on Feb. 15, 2007 in English and which claims the benefit of U.S. provisional patent application No. 60/702,101, filed Jul. 22, 2005.

FIELD OF THE INVENTION

The present invention relates generally to video encoding and decoding and, more particularly, to methods and apparatus for weighted prediction for scalable video encoding and decoding.

BACKGROUND OF THE INVENTION

The International Organization for Standardization/International Electrotechnical Commission (ISO/IEC) Moving Picture Experts Group-4 (MPEG-4) Part 10 Advanced Video Coding (AVC) standard/international Telecommunication Union, Telecommunication Sector (ITU-T) H.264 standard (hereinafter the "MPEG4/H.264 standard" or simply the "H.264 standard") is the first international video coding standard to include a Weighted Prediction (WP) tool. The scalable video coding (SVC) standard, which is currently being developed as an amendment of the H.264 standard (and is thus also interchangeably referred to herein as the "H.264 standard"), also adopts weighted prediction. However, the H.264 standard does not specify which weights (base layer or enhancement layer) should be used when using (scaled) base layer motion vector as predictors.

Moreover, during inter-layer prediction, the enhancement layer can use the motion vectors (via motion_prediction_flag_ lx[ ]) and residual data (via residual_prediction_flag) from the base layer as predictors. However, when different weighting parameters are used in the enhancement layer and base layer for a given macroblock, residual prediction is not practical due to the different weights used for the different layers of the same macroblock.

Weighted Prediction is supported in the Main, Extended, and High profiles of the H.264 standard. The use of WP is indicated in the sequence parameter set for P and SP slices using the weighted_pred_flag field, and for B slices using the weighting_bipred_idc field. There are two WP modes, an explicit mode and an implicit mode. The explicit mode is supported in P, SP, and B slices. The implicit mode is supported in only B slices.

weighted_pred_flag equal to 0 specifies that weighted prediction shall not be applied to P and SP slices. weighted_pred_ flag equal to 1 specifies that weighted prediction shall be applied to P and SP slices.

weighted_bipred_idc equal to 0 specifies that the default weighted prediction shall be applied to B slices. weighted_bipred_idc equal to 1 specifies that explicit weighted prediction shall be applied to B slices. weighted_bipred_idc equal to 2 specifies that implicit weighted prediction shall be applied to B slices. The value of weighted_bipred_idc is in the range of 0 to 2, inclusive.

A single weighting factor and offset are associated with each reference index for each color component in each slice.

In explicit mode, these WP parameters may be coded in the slice header. In implicit mode, these WP parameters are derived based only on the relative distance of the current picture and its reference pictures.

For each macroblock or macroblock partition, the weighting parameters applied are based on a reference picture index (or indices in the case of bi-prediction) of the current macroblock or macroblock partition. The reference picture indices are either coded in the bitstream or may be derived, e.g., for skipped or direct mode macroblocks. The use of the reference picture index to signal which weighting parameters to apply is bitrate efficient, as compared to requiring a weighting parameter index in the bitstream, since the reference picture index is already available based on the other required bitstream fields.

Many different methods of scalability have been widely studied and standardized, including SNR scalability, spatial scalability, temporal scalability, and fine grain scalability, in scalability profiles of the MPEG-2 and H.264 standards, or are currently being developed as an amendment of the H.264 standard.

For spatial, temporal and SNR scalability, a large degree of inter-layer prediction is incorporated. Intra and inter macroblocks can be predicted using the corresponding signals of previous layers. Moreover, the motion description of each layer can be used for a prediction of the motion description for following enhancement layers. These techniques fall into three categories: inter-layer intra texture prediction, inter-layer motion prediction and inter-layer residue prediction (via residual_prediction_flag).

In JSVM2.0, an enhancement layer macroblock can exploit inter-layer motion prediction using scaled base layer motion data, using either "BASE_LAYER_MODE" or "QPEL_REFINEMENT_MODE", as in case of dyadic (two-layer) spatial scalability. In addition, in macroblock (or sub-macroblock) prediction mode, the predictor of a motion vector can choose from a base_layer motion vector or an enhancement layer motion vector from a spatial neighbor, via motion_prediction_flag_lx[ ]. motion_prediction_flag_lx[ ] equal to 1 specifies that the (scaled) base layer motion vector are used as motion vector predictors. motion_prediction_flag_lx[ ] equal to 0 specifies that enhancement layer motion vector from spatial neighbors are used as motion vector predictors. If the enhancement layer and its previous layer have different pred_weight_table( ) values, for the case where motion_prediction_flag_lx[ ] is equal to 1, the H.264 standard does not specify which set of weights is to be used for the enhancement layer.

In JSVM2.0, an enhancement layer macroblock can exploit inter-layer residue prediction using (upsampled) base layer residue via the residue_prediction_flag. residue_prediction_flag equal to 1 specifies that the residual signal is predicted from the (upsampled) reconstructed residual signal of the base macroblock or sub-macroblock. residue_prediction_flag equal to 0 specifies that the residue signal is not predicted. However, the H.264 standard does not consider the fact that the two layers could have different sets of pred_ weight_table( ). As a result, the use of residual prediction may result in lower coding efficiency when the enhancement layer uses a different set of weights from the base layer (for a given macroblock) because, for such a case, the residue_prediction_ flag will seldom be set to 1. The transmission of the residue_prediction_flag for this case would only result in the wasting of bits.

SUMMARY OF THE INVENTION

These and other drawbacks and disadvantages of the prior art are addressed by the present invention, which is directed to methods and apparatus for weighted prediction for scalable video encoding and decoding.

According to an aspect of the present invention, there is provided a scalable video encoder. The scalable video encoder includes an encoder for encoding a block in an enhancement layer of a picture by using a motion vector that corresponds to a block in a lower layer of the picture as a motion vector predictor for the block in the enhancement layer, and using a weighting parameter that was applied to a particular lower layer reference picture to encode the block in the lower layer for motion compensation of the block in the enhancement layer. The block in the enhancement layer corresponds to the block in the lower layer.

According to another aspect of the present invention, there is provided a scalable video encoder, The scalable video encoder includes an encoder for encoding a block in an enhancement layer of a picture without sending a residue_prediction_flag syntax and without performing a residue prediction, when a different weighting parameter is applied to an enhancement layer reference picture as that applied to a particular lower layer reference picture used for encoding a block in a lower layer of the picture. The block in the enhancement layer corresponds to the block in the lower layer, and the enhancement layer reference picture corresponds to the particular lower layer reference picture.

According to yet another aspect of the present invention, there is provided a scalable video encoder. The scalable video encoder includes an encoder for encoding a block in enhancement layer of a picture by sending a residue_prediction_flag syntax, when a same weighting parameter is applied to an enhancement layer reference picture as that applied to a particular lower layer reference picture used for encoding a block in a lower layer of the picture. The block in the enhancement layer corresponds to the block in the lower layer, and the enhancement layer reference picture corresponds to the particular lower layer reference picture.

According to still another aspect of the present invention, there is provided a scalable video encoder. The scalable video encoder includes an encoder for encoding a block in an enhancement layer of a picture by rephrasing a weighted_pred_flag syntax and a weighted_bipred_idc syntax, and setting the weighted_pred_flag syntax to 2 and the weighted_bipred_idc syntax to 3, to indicate that a same weighting parameter is applied to an enhancement layer reference picture as that applied to a particular lower layer reference picture used for encoding a block in a lower layer of the picture. The block in the enhancement layer corresponds to the block in the lower layer, and the enhancement layer reference picture corresponds to the particular lower layer reference picture.

According to a further aspect of the present invention, there is provided a scalable video decoder. The scalable video decoder includes a decoder for decoding a block in an enhancement layer of a picture by using a motion vector that corresponds to a block in a lower layer of the picture as a motion vector predictor for the block in the enhancement layer, and using a weighting parameter that was applied to a particular lower layer reference picture to decode the block in the lower layer for motion compensation of the block in the enhancement layer. The block in the enhancement layer corresponds to the block in the lower layer.

According to a still further aspect of the present invention, there is provided a scalable video decoder. The scalable video decoder includes a decoder for decoding a block in an enhancement layer of a picture without receiving a residue_prediction_flag syntax and without performing a residue prediction, when a different weighting parameter is applied to an enhancement layer reference picture as that applied to a particular lower layer reference picture used for decoding a block in a lower layer of the picture. The block in the enhancement layer corresponds to the block in the lower layer, and the enhancement layer reference picture corresponds to the particular lower layer reference picture.

According to an additional aspect of the present invention, there is provided a scalable video decoder. The scalable video decoder includes a decoder for decoding a block in enhancement layer of a picture by receiving a residue_prediction_flag syntax, when a same weighting parameter is applied to an enhancement layer reference picture as that applied to a particular lower layer reference picture used for decoding a block in a lower layer of the picture. The block in the enhancement layer corresponds to the block in the lower layer, and the enhancement layer reference picture corresponds to the particular lower layer reference picture.

According to a yet additional aspect of the present invention, there is provided a scalable video decoder. The scalable video decoder includes a decoder for decoding a block in an enhancement layer of a picture by receiving a rephrased weighted_pred_flag syntax and a rephrased weighted_bipred_idc syntax, the rephrased weighted_pred_flag syntax and the rephrased weighted_bipred_idc syntax set to 2 and 3, respectively, to indicate that a same weighting parameter is applied to an enhancement layer reference picture as that applied to a particular lower layer reference picture used for decoding a block in a lower layer of the picture. The block in the enhancement layer corresponds to the block in the lower layer, and the enhancement layer reference picture corresponds to the particular lower layer reference picture.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which:

FIG. 7 is a flow diagram for an exemplary method for decoding weighted_pred_flag and weighted_bipred_idc for a macroblock, in accordance with the principles of the present invention.

DETAILED DESCRIPTION

Figure 1:
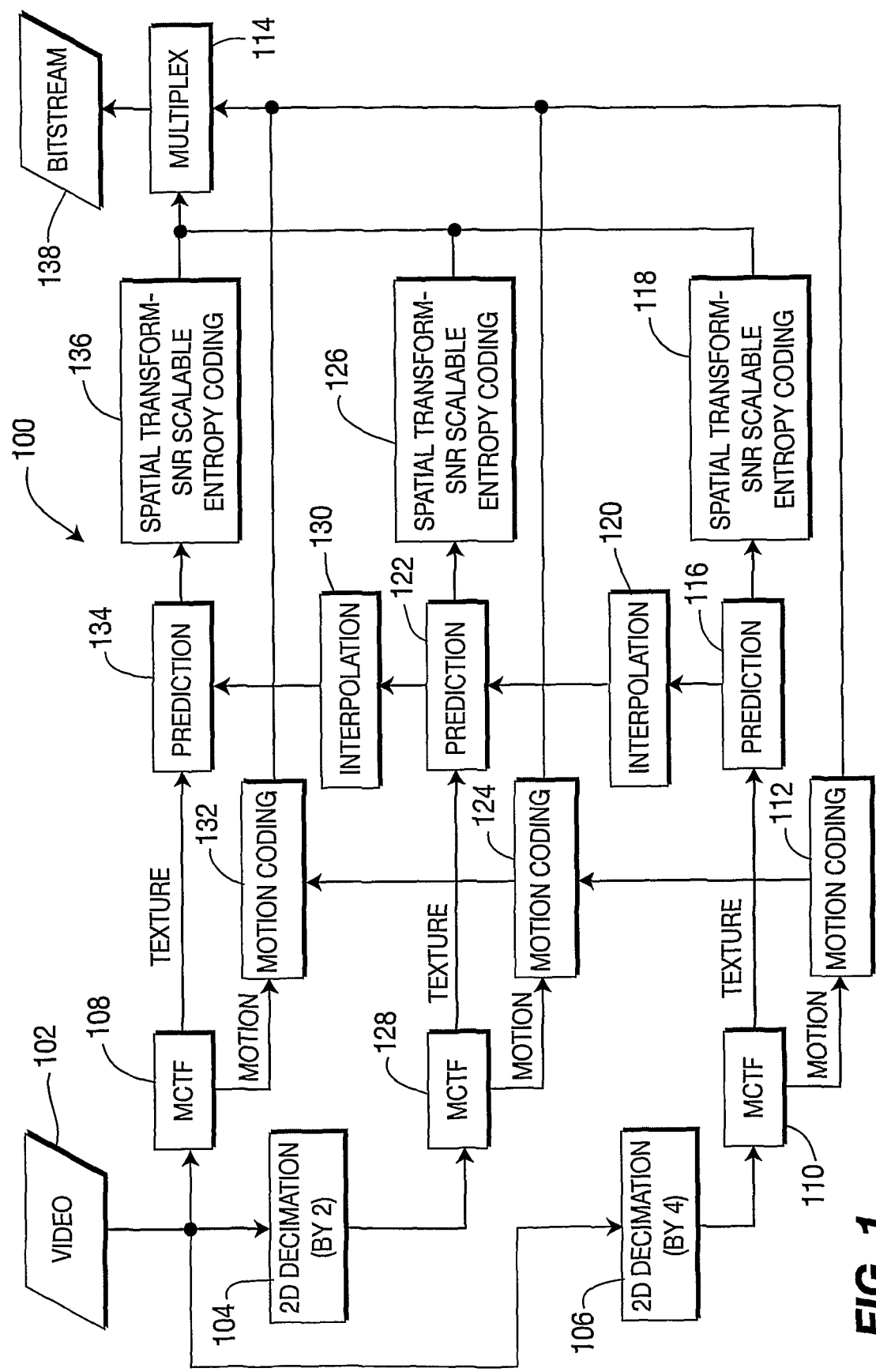
FIG. 1 shows a block diagram for an exemplary Joint Scalable Video Model (JSVM) 2.0 encoder to which the present principles may be applied.

The present invention is directed to methods and apparatus for weighted prediction for scalable video encoding and decoding. Such methods and apparatus advantageously do not use or require any new syntax. Rather, existing syntax may simply be rephrased to facilitate the advantages offered by the present invention.

As noted above, weighted prediction has been adopted in the H.264 standard to improve coding efficiency. In accordance with the present principles, syntax/semantics changes related to inter-layer prediction are changed when applied to weighted prediction for scalable video coding. In particular, the semantics for the motion vector prediction flag are changed and the syntax of residue prediction flag is simplified. Methods and apparatus are provided for reusing the base layer weights for the enhancement layer. The methods and apparatus make use of existing syntax and do not add any new syntax to the current H.264 or SVC standards.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Turning to FIG. 1, an exemplary Joint Scalable Video Model Version 2.0 (hereinafter "JSVM2.0") encoder to which the present invention may be applied is indicated generally by the reference numeral 100. The JSVM2.0 encoder 100 uses three spatial layers and motion compensated temporal filtering. The JSVM encoder 100 includes a two-dimensional (2D) decimator 104, a 2D decimator 106, and a motion compensated temporal filtering (MCTF) module 108, each having an input for receiving video signal data 102.

An output of the 2D decimator 106 is connected in signal communication with an input of a MCTF module 110. A first output of the MCTF module 110 is connected in signal communication with an input of a motion coder 112, and a second output of the MCTF module 110 is connected in signal communication with an input of a prediction module 116. A first output of the motion coder 112 is connected in signal communication with a first input of a multiplexer 114. A second output of the motion coder 112 is connected in signal communication with a first input of a motion coder 124. A first output of the prediction module 116 is connected in signal communication with an input of a spatial transformer 118. An output of the spatial transformer 118 is connected in signal communication with a second input of the multiplexer 114. A second output of the prediction module 116 is connected in signal communication with an input of an interpolator 120. An output of the interpolator is connected in signal communication with a first input of a prediction module 122. A first output of the prediction module 122 is connected in signal communication with an input of a spatial transformer 126. An output of the spatial transformer 126 is connected in signal communication with the second input of the multiplexer 114. A second output of the prediction module 122 is connected in signal communication with an input of an interpolator 130. An output of the interpolator 130 is connected in signal communication with a first input of a prediction module 134. An output of the prediction module 134 is connected in signal communication with a spatial transformer 136. An output of the spatial transformer is connected in signal communication with a third input of a multiplexer 114.

An output of the 2D decimator 104 is connected in signal communication with an input of a MCTF module 128. A first output of the MCTF module 128 is connected in signal communication with a second input of the motion coder 124. A first output of the motion coder 124 is connected in signal communication with the first input of the multiplexer 114. A second output of the motion coder 124 is connected in signal communication with a first input of a motion coder 132. A second output of the MCTF module 128 is connected in signal communication with a second input of the prediction module 122.

A first output of the MCTF module 108 is connected in signal communication with a second input of the motion coder 132. An output of the motion coder 132 is connected in signal communication with the first input of the multiplexer 114. A second output of the MCTF module 108 is connected in signal communication with a second input of the prediction module 134. An output of the multiplexer 114 provides an output bitstream 138.

For each spatial layer, a motion compensated temporal decomposition is performed. This decomposition provides temporal scalability. Motion information from lower spatial layers can be used for prediction of motion on the higher layers. For texture encoding, spatial prediction between successive spatial layers can be applied to remove redundancy. The residual signal resulting from intra prediction or motion compensated inter prediction is transform coded. A quality base layer residual provides minimum reconstruction quality at each spatial layer. This quality base layer can be encoded into an H.264 standard compliant stream if no inter-layer prediction is applied. For quality scalability, quality enhancement layers are additionally encoded. These enhancement layers can be chosen to either provide coarse or fine grain quality (SNR) scalability.

Figure 2:
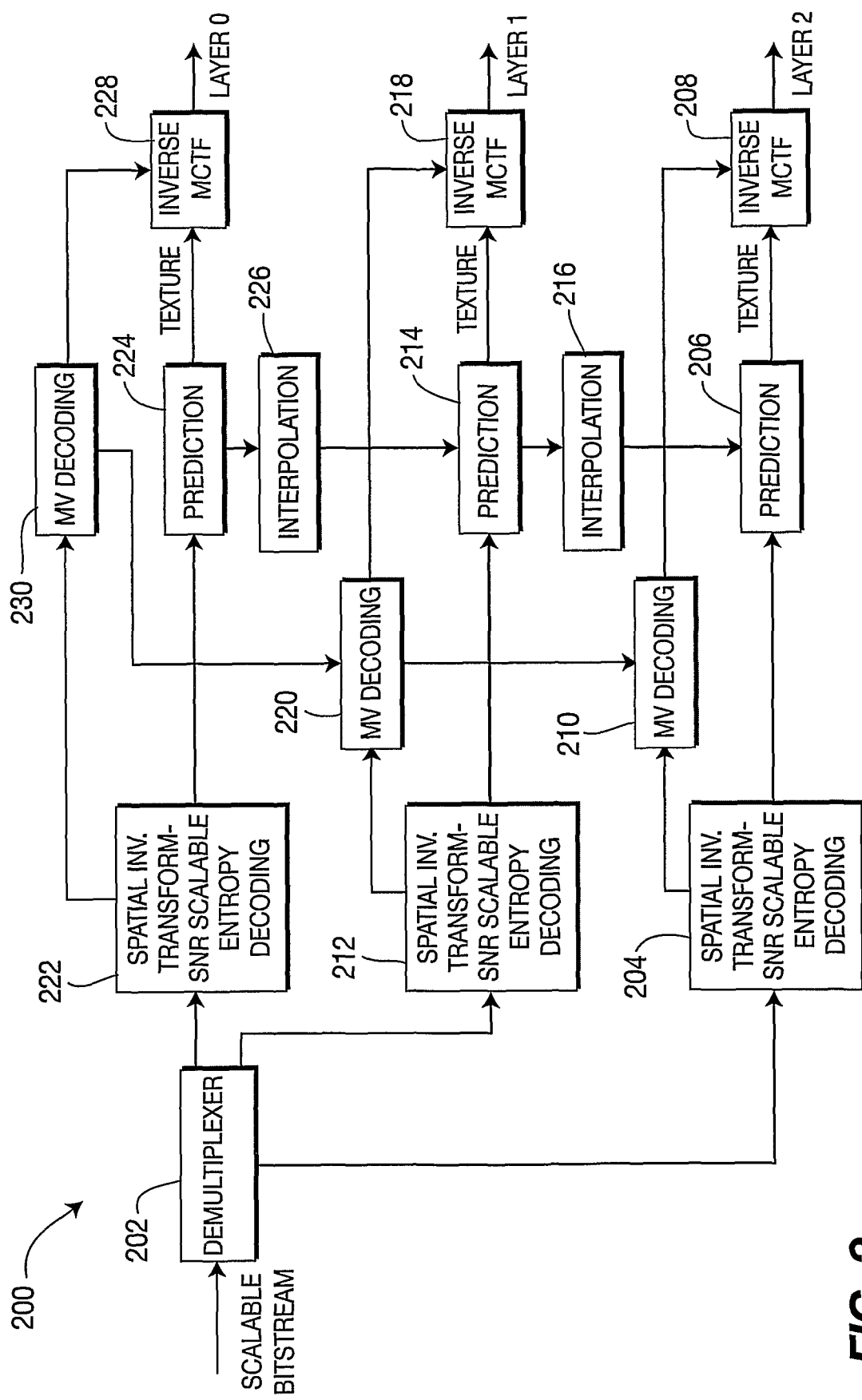
FIG. 2 shows a block diagram for an exemplary video decoder to which the present principles may be applied.

Turning to FIG. 2, an exemplary scalable video decoder to which the present invention may be applied is indicated generally by the reference numeral 200. An input of a demultiplexer 202 is available as an input to the scalable video decoder 200, for receiving a scalable bitstream. A first output of the demultiplexer 202 is connected in signal communication with an input of a spatial inverse transform SNR scalable entropy decoder 204. A first output of the spatial inverse transform SNR scalable entropy decoder 204 is connected in signal communication with a first input of a prediction module 206. An output of the prediction module 206 is connected in signal communication with a first input of an inverse MCTF module 208.

A second output of the spatial inverse transform SNR scalable entropy decoder 204 is connected in signal communication with a first input of a motion vector (MV) decoder 210. An output of the MV decoder 210 is connected in signal communication with a second input of the inverse MCTF module 208.

A second output of the demultiplexer 202 is connected in signal communication with an input of a spatial inverse transform SNR scalable entropy decoder 212. A first output of the spatial inverse transform SNR scalable entropy decoder 212 is connected in signal communication with a first input of a prediction module 214. A first output of the prediction module 214 is connected in signal communication with an input of an interpolation module 216. An output of the interpolation module 216 is connected in signal communication with a second input of the prediction module 206. A second output of the prediction module 214 is connected in signal communication with a first input of an inverse MCTF module 218.

A second output of the spatial inverse transform SNR scalable entropy decoder 212 is connected in signal communication with a first input of an MV decoder 220. A first output of the MV decoder 220 is connected in signal communication with a second input of the MV decoder 210. A second output of the MV decoder 220 is connected in signal communication with a second input of the inverse MCTF module 218.

A third output of the demultiplexer 202 is connected in signal communication with an input of a spatial inverse transform SNR scalable entropy decoder 222. A first output of the spatial inverse transform SNR scalable entropy decoder 222 is connected in signal communication with an input of a prediction module 224. A first output of the prediction module 224 is connected in signal communication with an input of an interpolation module 226. An output of the interpolation module 226 is connected in signal communication with a second input of the prediction module 214.

A second output of the prediction module 224 is connected in signal communication with a first input of an inverse MCTF module 228. A second output of the spatial inverse transform SNR scalable entropy decoder 222 is connected in signal communication with an input of an MV decoder 230. A first output of the MV decoder 230 is connected in signal communication with a second input of the MV decoder 220. A second output of the MV decoder 230 is connected in signal communication with a second input of the inverse MCTF module 228.

An output of the inverse MCTF module 228 is available as an output of the decoder 200, for outputting a layer 0 signal. An output of the inverse MCTF module 218 is available as an output of the decoder 200, for outputting a layer 1 signal. An output of the inverse MCTF module 208 is available as an output of the decoder 200, for outputting a layer 2 signal.

It has been proposed to add a new syntax base_pred_weight_table_flag in slice_header_in_scalable_extension( ) to specify that the enhancement layer reuses the pred_weight_ table( ) from its previous layer. However, distinct from the proposed approach and, in accordance with the present principles, we instead disclose semantic changes to the motion_ prediction_flag_lx[ ] and simplify the residual_prediction_flag in order to clarify their use (and thus improve coding efficiency) when weighted prediction is used.

The H.264 standard supports the use of a different pred_weight_table( ) for the base and enhancement layers. Thus, it is possible to use different weights (base layer weights or enhancement layer weights) for each macroblock by selecting the appropriate weight table. It is also possible that the base and enhancement layer have the same set of weights. This may be indicated as a separate flag in the bitstream syntax or can be easily checked for by comparing the two sets (base layer and enhancement layer) of weights.

The encoder has a choice of which motion vectors are used as predictors in (sub) macroblock prediction modes. It is possible to use the motion vector predictors from spatial neighbors in the enhancement layer or the (scaled) motion vectors from the base layer as a motion vector predictor for the (sub)MB. When weighted prediction is used, the reference macroblock has to be weighted with a set of weights. When using the base layer motion vectors as predictors, it would seem desirable to use the base layer weights to weight the corresponding macroblock. To make the decoder aware of this condition (i.e., the reusing of the base layer weights for the enhancement layer), we propose a semantic change for the motion_prediction_flag_lx[ ]. In particular, we propose to add the following line to the already existing definition of the syntax: motion_prediction_flag_l0[mbPartIdx] equal to 1 specifies that the base layer pred_weight_table( ) will be used to perform weighted prediction on the current macroblock.

One advantage of adding the above new line to the already existing definition of the motion_prediction_flag_lx[ ] syntax is that we can allow multiple weighting parameters for same reference index. This results in coding efficiency since we can save the bits to code additional reference indices. This is especially helpful for sequences that include a lot of local brightness changes.

The Joint Scalable Video Model (JSVM), which is an extension/amendment of the H.264 standard, also supports inter-layer residual prediction, where the residual signal is predicted by the (upsampled) reconstructed residual signal of the base macroblock or sub-macroblock. Currently, the H.264 standard does not take into consideration the fact that the base and enhancement layer could use different sets of weights when using the base layer residual for prediction. In accordance with the present principles, we propose a syntax/semantic change to the residual_in_scalable_extension( ) syntax table as indicated in Table 1.

TABLE 1

```
residual_in_scalable_extension( ) {                                                    C    Descriptor
    if( base_id_plus1 != 0 && adaptive_prediction_flag &&
        MbPartPredType( mb_type, 0 ) != Intra_16x16 &&
        MbPartPredType( mb_type, 0 ) != Intra_8x8 &&
        MbPartPredType( mb_type, 0 ) != Intra_4x4 &&
        MbPartPredType( mb_type, 0 ) != Intra_Base &&
        )
    If(((weighted_pred_flag && slice_type==PE) || (weighted_bipred_idc &&
        slice_type == BE)) && (baseLayerWeights == currentLayerWeights))
            residual_prediction_flag                                                   3|4    ae(v)
    if( MbPartPredMode( mb_type, 0 ) == Intra_16x16 )
        residual_block_cabac( Intra16x16DCLevel, 16 )                                   3
    for( i8x8 = 0; i8x8 < 4; i8x8++ ) /* each luma 8x8 block */
        if( !transform_size_8x8_flag )
            for( i4x4 = 0; i4x4 < 4; i4x4++ ) { /* each 4x4 sub-block of block */
                if( CodedBlockPatternLuma & ( 1 << i8x8 ) )
                    if( MbPartPredMode( mb_type, 0 ) = = Intra_16x16 )
                        residual_block_cabac( Intra16x16ACLevel[i8x8 * 4 + i4x4], 15 )  3
                    Else
                        residual_block_cabac( LumaLevel[ i8x8 * 4 + i4x4 ], 16 )       3|4
                else if( MbPartPredMode( mb_type, 0 ) = = Intra_16x16 )
                    for( i = 0; i < 15; i++ )
                        Intra16x16ACLevel[ i8x8 * 4 + i4x4 ][ i ] = 0
                Else
                    for( i = 0; i < 16; i++ )
                        LumaLevel[ i8x8 * 4 + i4x4 ][ i ] = 0
            }
        else if( CodedBlockPatternLuma & ( 1 << i8x8 ) )
            residual_block_cabac( LumaLevel8x8[ i8x8 ], 64 )                           3|4
        Else
            for( i = 0; i < 64; i++ )
                LumaLevel8x8[ i8x8 ][ i ] = 0
    if( chroma_format_idc != 0 ) {
        NumC8x8 = 4 / (SubWidthC * SubHeightC)
        for( iCbCr = 0; iCbCr < 2; iCbCr++ )
            if( CodedBlockPatternChroma & 3 ) /* chroma DC residual present */
                residual_block_cabac( ChromaDCLevel[ iCbCr ], 4 * NumC8x8 )            3|4
            Else
                for( i = 0; i < 4 * NumC8x8; i++ )
                    ChromaDCLevel[ iCbCr ][ i ] = 0
        for( iCbCr = 0; iCbCr < 2; iCbCr++ )
            for( i8x8 = 0; i8x8 < NumC8x8; i8x8++ )
                for( i4x4 = 0; i4x4 < 4; i4x4++ )
                    if( CodedBlockPatternChroma & 2 )
                                /* chroma AC residual present */
                        residual_block_cabac( ChromaACLevel[ iCbCr ][ i8x8*4 + i4x4 ], 3|4
                            15)
                    else
                        for( i = 0; i < 15; i++ )
                            ChromaACLevel[ iCbCr ][ i8x8*4 + i4x4 ][ i ] = 0
}
```

In accordance with the present principles, the residual_prediction_flag is not sent when different sets of weights are used in the base and enhancement layer for the given enhancement layer macroblock. As a result of not sending residual_prediction_flag, some bitrate savings can be achieved. Moreover, in accordance with the present principles, the semantics of residual_prediction_flag is changed as described herein.

residual_prediction_flag equal to 1 specifies that the residual signal is predicted by the (upsampled) reconstructed residual signal of the base macroblock or sub-macroblock. residual_prediction_flag equal to 0 specifies that the residual signal is not predicted.

When the syntax element residual_prediction is not present, residual_prediction_flag is inferred as follows.

If mb_type does not specify an I macroblock type and base_id_plus1 is greater than 0, then residual_prediction_flag is inferred to be equal to 1. If baseLayerWeights are the different from the currentLayerWeights, then residual_prediction_flag is inferred to be equal to 0. Otherwise, if both of the preceding conditions that result in the residual_prediction_flag being inferred to be equal to 1 are not true, then residual_prediction_flag is inferred to be equal to 0.

As previously described, it has been proposed to add a new syntax base_pred_weight_table_flag in slice_header_in_scalable_extension( ) to specify that the enhancement layer re-uses the pred_weight_table( ) from its previous layer. In contrast to the immediately preceding proposed new syntax, and in accordance with the principles of the present invention, we propose to add no new syntax and re-use the existing syntax in the H.264 standard. That is, we change the semantics of weighted_pred_flag and weighted_bipred_flag, so no new syntax is added.

weighted_pred_flag equal to 0 specifies that weighted prediction shall not be applied to P/EP and SP slices. weighted_pred_flag equal to 1 specifies that explicit weighted prediction shall be applied to P/EP and SP slices. weighted_pred_flag equal to 2 specifies that the enhancement layer re-uses the pred_weight_table( ) from its base layer if the base_layer exists. The value of weighted_pred_flag shall be in the range of 0 to 2, inclusive.

weighted_bipred_idc equal to 0 specifies that the default weighted prediction shall be applied to B/EB slices. weighted_bipred_idc equal to 1 specifies that explicit weighted prediction shall be applied to B/EB slices. weighted_bipred_idc equal to 2 specifies that implicit weighted prediction shall be applied to B/EB slices. weighted_bipred_idc equal to 3 specifies that the enhancement layer re-uses the pred_weight_table( ) from its base layer if the base_layer exists. The value of weighted_bipred_idc shall be in the range of 0 to 3, inclusive.

Figure 3:
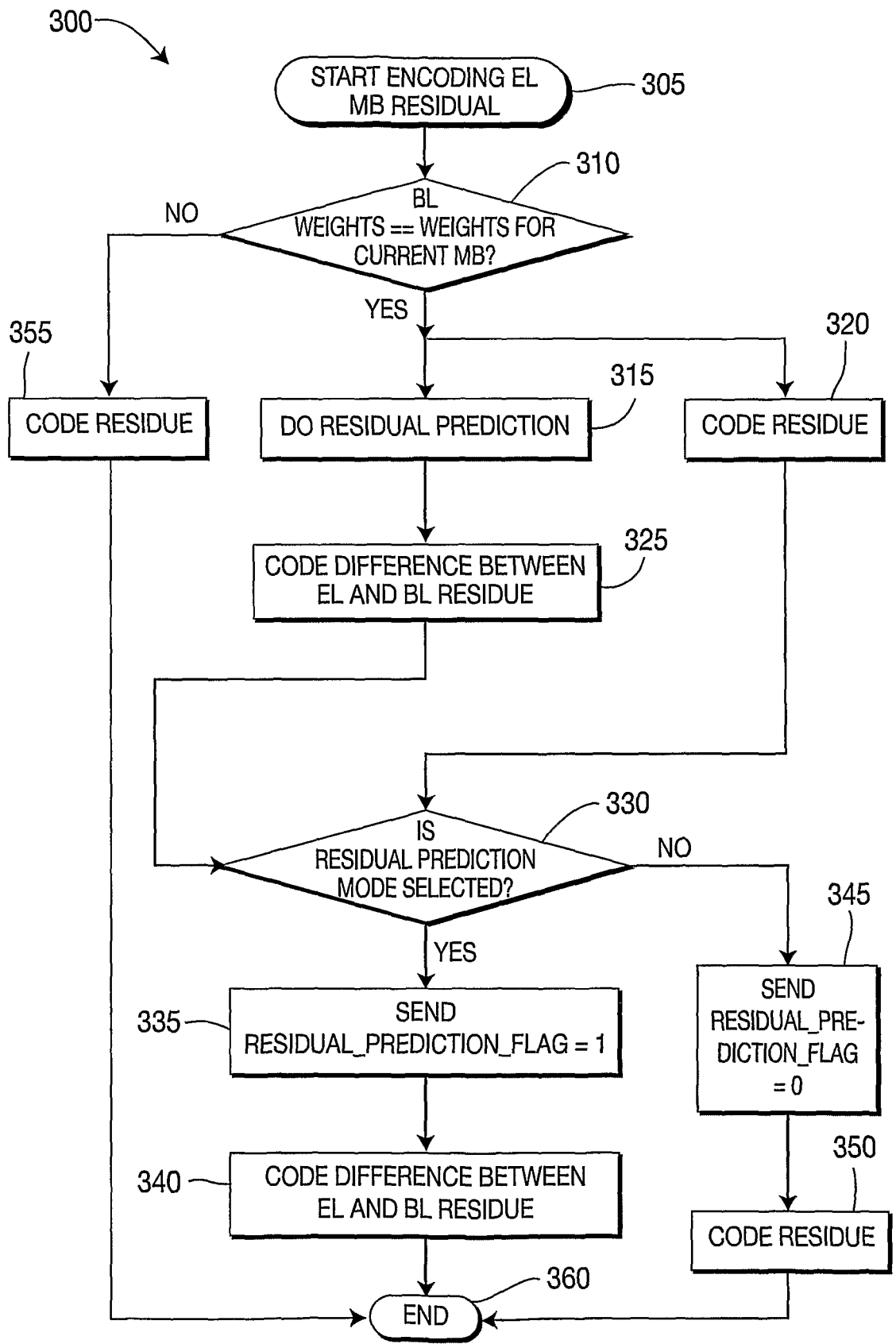
FIG. 3 is a flow diagram for an exemplary method for encoding a residue prediction flag for a macroblock, in accordance with the principles of the present invention.

Turning to FIG. 3, a method for encoding a residue prediction flag for a macroblock is indicated generally by the reference numeral 300.

The method includes a start block 305 that starts encoding a current enhancement layer (EL) macroblock (MB) residual, and passes control to a decision block 310. The decision block 310 checks whether or not the base layer and the current layer use the same weighting parameter. If so (i.e., the same weighting parameter is to be applied), then control is passed to function blocks 315 and 320. Otherwise, control is passed to a function block 355.

The function block 320 codes the residue, and passes control to a decision block 330.

The function block 315 performs residual prediction, and passes control to a function block 325. The function block 325 codes the difference between the enhancement layer and the base layer residue, and passes control to the decision block 330.

The decision block 330 determines whether or not the residual prediction mode is selected. If so, then control is passed to a function block 335. Otherwise, control is passed to a function block 345.

The function block 335 sends the residue_prediction_flag set equal to 1 in a macroblock header, and passes control to a function block 340. The function block 340 codes the difference between the enhancement layer residue and the base layer residue, and passes control to an end block 360.

The function block 345 sends the residue_prediction flag set equal to 0 in a macroblock header, and passes control to a function block 350. The function block 350 codes the residue, and passes control to the end block 360.

The function block 355 codes the residue, and passes control to the end block 360.

Figure 4:
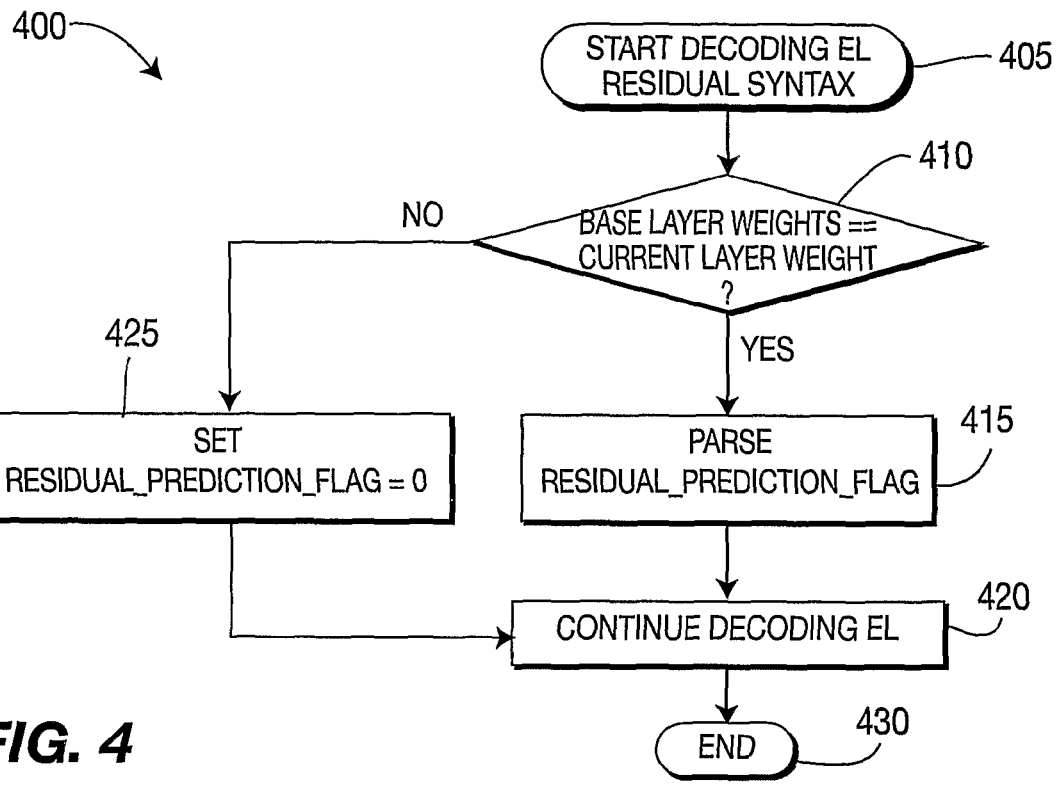
FIG. 4 is a flow diagram for an exemplary method for decoding a residue prediction flag for a macroblock, in accordance with the principles of the present invention.

Turning to FIG. 4, a method for decoding a residue prediction flag for a macroblock is indicated generally by the reference numeral 400.

The method includes a start block 405 that starts decoding a current enhancement layer (EL) macroblock (MB) residual, and passes control to a decision block 410. The decision block 410 checks whether or not the base layer and the current layer use the same weighting parameter. If so (i.e., the same weighting parameter is to be applied), then control is passed to function blocks 415. Otherwise, control is passed to a function block 425.

The function block 415 parses the residual_prediction_flag, and passes control to a function block 420. The function block 420 continues decoding the enhancement layer, and passes control to an end block 430.

The function block 425 sets the residual_prediction_flag to zero, and passes control to the function block 420.

Figure 5:
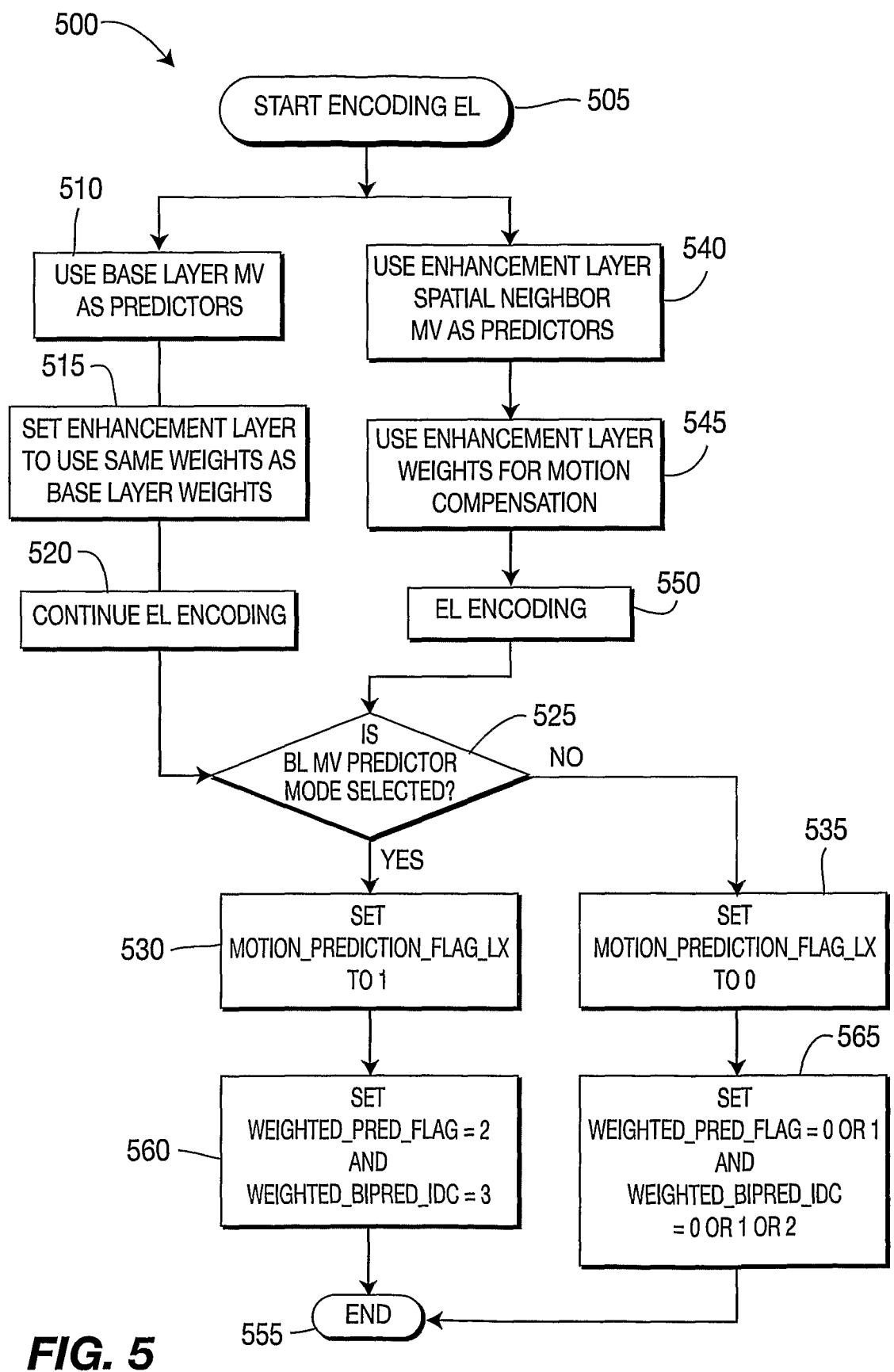
FIG. 5 is a flow diagram for an exemplary method for encoding a motion prediction flag for a macroblock, in accordance with the principles of the present invention.

Turning to FIG. 5, a method for encoding a motion prediction flag for a macroblock is indicated generally by the reference numeral 500.

The method includes a start block 505 that starts encoding a current enhancement layer (EL), and passes control to function blocks 510 and 540. The function block 510 uses the base layer motion vectors as predictors, and passes control to a function block 515. The function block 515 sets the enhancement layer to apply the same weighting parameter to an enhancement layer reference picture as that applied to a particular lower layer reference picture used for encoding a block in a lower layer of the picture, wherein the block in the enhancement layer corresponds to the block in the lower layer, and the enhancement layer reference picture corresponds to the particular lower layer reference picture, and passes control to a function block 520. The function block 520 continues encoding the enhancement layer, and passes control to a decision block 525. The decision block 525 determines whether or not the base layer motion vector predictor mode is selected. If so, then control is passed to a function block 530. Otherwise, control is passed to a function block 535.

The function block 530 sets the motion_prediction_flag_lx to one, and passes control to a function block 560. The function block 560 sets weighted_pred_flag equal to two and weighted_bipred_idc equal to 3, and passes control to an end block 555.

The function block 535 sets the motion_prediction_flag_lx to zero, and passes control to a function block 565. The function block 565 sets weighted_pred_flag equal to zero or one and weighted_bipred_idc equal to zero or one or two, and passes control to the end block 555.

The function block 540 uses the enhancement layer spatial neighbor motion vectors as predictors, and passes control to a function block 545. The function block uses the enhancement layer weights for motion compensation, and passes control to a function block 550. The function block 550 performs enhancement layer encoding, and passes control to the decision block 525.

Figure 6:
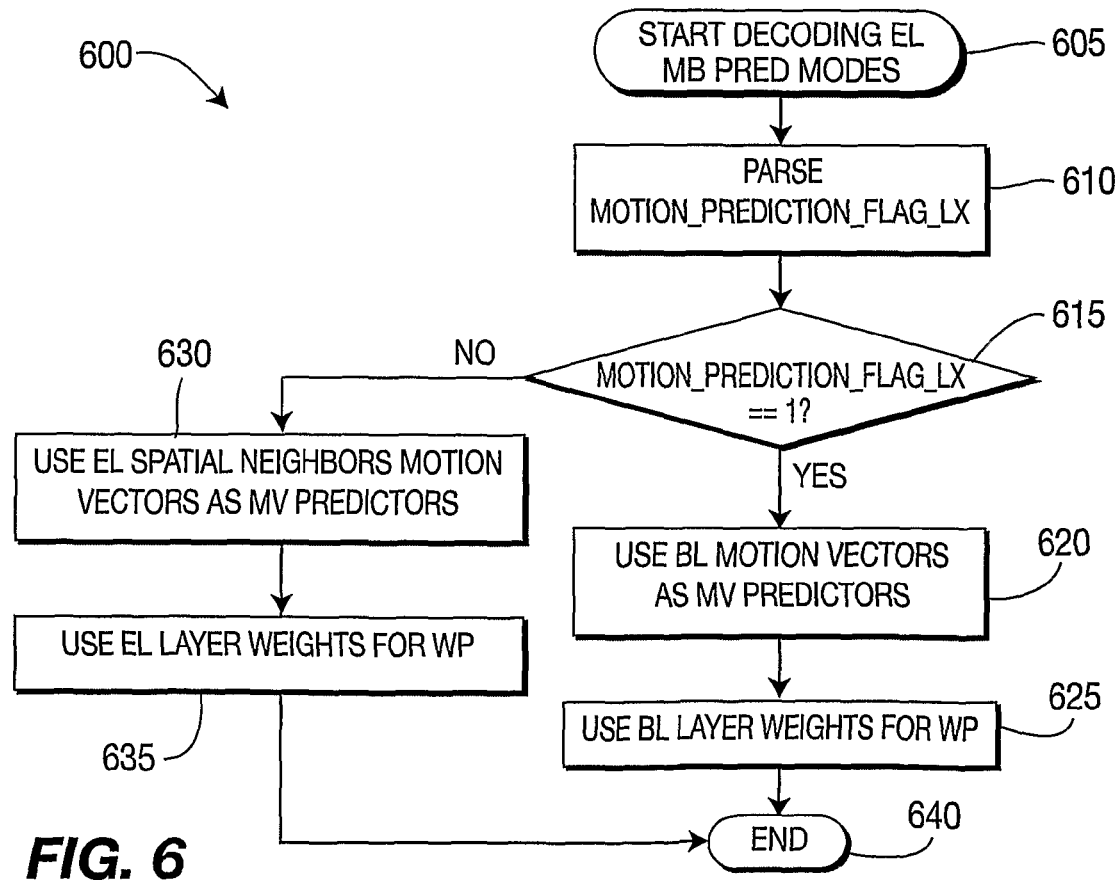
FIG. 6 is a flow diagram for an exemplary method for decoding a motion prediction flag for a macroblock, in accordance with the principles of the present invention.

Turning to FIG. 6, a method for decoding a motion prediction flag for a macroblock is indicated generally by the reference numeral 600.

The method includes a start block 605 that starts decoding enhancement layer (EL) macroblock prediction modes, and passes control to a function block 610. The decision block 610 parses the motion_prediction_flag_lx, and passes control to a decision block 615. The decision block 615 determines whether or not the motion_prediction_flag_lx is equal to one. If so, then control is passes to a function block 620. Otherwise, control is passed to a function block 630.

The function block 620 uses the base layer motion vectors as motion vector predictors, and passes control to a function block 625. The function block 625 uses the base layer weights for weighted prediction, and passes control to an end block 640.

The function block 630 uses the motion vectors of enhancement layer spatial neighbors as motion vector predictors, and passes control to a function block 635. The function block 635 uses the enhancement layer weights for weighted prediction, and passes control to the end block 640.

Turning to FIG. 7, a method for decoding weighted_pred_flag and weighted_bipred_idc for a macroblock is indicated generally by the reference numeral 700.

A start block 705 passes control to a function block 710. The function block 710 parses weighted_pred_flag and weighted_bipred_idc, and passes control to a decision block 715 and a decision block 740.

The decision block 715 determines whether or not weighted_pred_flag is equal to 0. If so, control is passed to a function block 720. Otherwise, control is passed to a decision block 725.

The function block 720 omits performing weighted prediction, and passes control to an end block 775.

The decision block 725 determines whether or not weighted_pred_flag is equal to 1. If so, control is passed to a function block 730. Otherwise, control is passed to a function block 735.

The function block 730 uses explicit weighted prediction, and passes control to the end block 775.

The function block 735 has the enhancement layer reuse the weight table of the base layer, and passes control to the end block 775.

The decision block 740 determines whether or not weighted_bipred_idc is equal to 0. If so, control is passed to a function block 745. Otherwise, control is passed to a decision block 750.

The function block 745 uses the default weighted prediction, and passes control to the end block 775.

The decision block 750 determines whether or not weighted_bipred_idc is equal to 1. If so, control is passed to a function block 755. Otherwise, control is passed to a decision block 760.

The function block 755 uses explicit weighted prediction, and passes control to the end block 775.

The decision block 760 determines whether or not weighted_bipred_idc is equal to 2. If so, control is passed to a function block 765. Otherwise, control is passed to a function block 770.

The function block 770 uses implicit weighted prediction, and passes control to the end block 775.

A description will now be given of some of the many attendant advantages/features of the present invention, some of which have been mentioned above. For example, one advantage/feature is a scalable video encoder that includes an encoder for encoding a block in an enhancement layer of a picture by using a motion vector that corresponds to a block in a lower layer of the picture as a motion vector predictor for the block in the enhancement layer, and using a weighting parameter that was applied to a particular lower layer reference picture to encode the block in the lower layer for motion compensation of the block in the enhancement layer. The block in the enhancement layer corresponds to the block in the lower layer. Another advantage/feature is the scalable video encoder as described above, wherein the encoder encodes the block in the enhancement layer by selecting between an explicit weighting parameter mode and an implicit weighting parameter mode. Yet another advantage/feature is the scalable video encoder as described above, wherein the encoder imposes a constraint that the weighting parameter applied to the lower layer reference is always used for motion compensation of the block in the enhancement layer, when the motion vector corresponding to the block in the lower layer is used as the motion vector predictor for the block in the enhancement layer. Moreover, another advantage/feature is a scalable video encoder that includes an encoder for encoding a block in an enhancement layer of a picture without sending a residue_prediction_flag syntax and without performing a residue prediction, when a different weighting parameter is applied to an enhancement layer reference picture as that applied to a particular lower layer reference picture used for encoding a block in a lower layer of the picture. The block in the enhancement layer corresponds to the block in the lower layer, and the enhancement layer reference picture corresponds to the particular lower layer reference picture. Further, another advantage/feature is the scalable video encoder as described above, wherein the encoder encodes the block in the enhancement layer by selecting between an explicit weighting parameter mode and an implicit weighting parameter mode. Also, another advantage/feature is a scalable video encoder that includes an encoder for encoding a block in enhancement layer of a picture by sending a residue_prediction_flag syntax, when a same weighting parameter is applied to an enhancement layer reference picture as that applied to a particular lower layer reference picture used for encoding a block in a lower layer of the picture. The block in the enhancement layer corresponds to the block in the lower layer, and the enhancement layer reference picture corresponds to the particular lower layer reference picture. Additionally, another advantage/feature is the scalable video encoder as described above, wherein the encoder encodes the block in the enhancement layer by selecting between an explicit weighting parameter mode and an implicit weighting parameter mode. Moreover, another advantage/feature is a scalable video encoder that includes an encoder for encoding a block in an enhancement layer of a picture by rephrasing a weighted_pred_flag syntax and a weighted_bipred_idc syntax, and setting the weighted_pred_flag syntax to 2 and the weighted_bipred_idc syntax to 3, to indicate that a same weighting parameter is applied to an enhancement layer reference picture as that applied to a particular lower layer reference picture used for encoding a block in a lower layer of the picture. The block in the enhancement layer corresponds to the block in the lower layer, and the enhancement layer reference picture corresponds to the particular lower layer reference picture.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. An apparatus comprising an encoder for encoding a block in an enhancement layer of a picture by using a motion vector that corresponds to a block in a lower layer of the picture as a motion vector predictor for the block in the enhancement layer, selecting from among an option to use a same weighting parameter applied to a lower layer reference picture to encode the block in the lower layer for motion compensation of the block in the enhancement layer and another option to use a different weighting parameter, and using the same weighting parameter for motion compensation of the block in the enhancement layer when the option to use the same weighting parameter is selected, wherein the block in the enhancement layer corresponds to the block in the lower layer.

2. The apparatus of claim 1, wherein said encoder encodes the block in the enhancement layer by selecting between an explicit weighting parameter mode and an implicit weighting parameter mode.

3. The apparatus of claim 1, wherein said encoder imposes a constraint that the same weighting parameter applied to the lower layer reference is always used for motion compensation of the block in the enhancement layer, when the motion vector corresponding to the block in the lower layer is used as the motion vector predictor for the block in the enhancement layer.

4. An apparatus comprising an encoder for encoding a block in an enhancement layer of a picture by rephrasing a weighted_pred_flag syntax and a weighted_bipred_idc syntax, and setting the weighted_pred_flag syntax to 2 and the weighted_bipred_idc syntax to 3, to indicate that a same weighting parameter is selectively applied to an enhancement layer reference picture as that applied to a lower layer reference picture used for encoding a block in a lower layer of the picture, wherein the block in the enhancement layer corresponds to the block in the lower layer, the enhancement layer reference picture corresponds to the lower layer reference picture, and the encoder selects the same weighting parameter from among an option of applying a different weighting parameter to the enhancement layer reference picture as that applied to the lower layer reference picture used for encoding the block in the lower layer and another option of applying the same weighting parameter.

5. A method for scalable video encoding comprising encoding a block in an enhancement layer of a picture by using a motion vector that corresponds to a block in a lower layer of the picture as a motion vector predictor for the block in the enhancement layer, selecting from among an option to use a same weighting parameter applied to a lower layer reference picture to encode the block in the lower layer for motion compensation of the block in the enhancement layer and another option to use a different weighting parameter, and using the same weighting parameter for motion compensation of the block in the enhancement layer when the option to use the same weighting parameter is selected, wherein the block in the enhancement layer corresponds to the block in the lower layer.

6. The method of claim 5, wherein said encoding step encodes the block in the enhancement layer by selecting between an explicit weighting parameter mode and an implicit weighting parameter mode.

7. The method of claim 5, wherein said encoding step comprises imposing a constraint that the same weighting parameter applied to the lower layer reference is always used for motion compensation of the block in the enhancement layer, when the motion vector corresponding to the block in the lower layer is used as the motion vector predictor for the block in the enhancement layer.

8. A method for scalable video encoding comprising encoding a block in an enhancement layer of a picture by rephrasing a weighted_pred_flag syntax and a weighted_bipred_idc syntax, and setting the weighted_pred_flag syntax to 2 and the weighted_bipred_idc syntax to 3, to indicate that a same weighting parameter is selectively applied to an enhancement layer reference picture as that applied to a lower layer reference picture used for encoding a block in a lower layer of the picture, wherein the block in the enhancement layer corresponds to the block in the lower layer, the enhancement layer reference picture corresponds to the lower layer reference picture, and the encoding step selects the same weighting parameter from among an option of applying a different weighting parameter to the enhancement layer reference picture as that applied to the lower layer reference picture used for encoding the block in the lower layer and another option of applying the same weighting parameter.

9. An apparatus comprising a decoder for decoding a block in an enhancement layer of a picture by using a motion vector that corresponds to a block in a lower layer of the picture as a motion vector predictor for the block in the enhancement layer, selecting from among an option to use a same weighting parameter applied to a lower layer reference picture to decode the block in the lower layer for motion compensation of the block in the enhancement layer and another option to use a different weighting parameter, and using the same weighting parameter for motion compensation of the block in the enhancement layer when the option to use the same weighting parameter is selected, wherein the block in the enhancement layer corresponds to the block in the lower layer.

10. The apparatus of claim 9, wherein said decoder decodes the block in the enhancement layer by determining whether to use an explicit weighting parameter mode or an implicit weighting parameter mode.

11. The apparatus of claim 9, wherein said decoder complies with a constraint imposed by a corresponding encoder that the same weighting parameter applied to the lower layer reference is always used for motion compensation of the block in the enhancement layer, when the motion vector corresponding to the block in the lower layer is used as the motion vector predictor for the block in the enhancement layer.

12. An apparatus comprising a decoder for decoding a block in an enhancement layer of a picture by receiving a rephrased weighted_pred_flag syntax and a rephrased weighted_bipred_idc syntax, the rephrased weighted_pred_flag syntax and the rephrased weighted_bipred_idc syntax set to 2 and 3, respectively, to indicate that a same weighting parameter is selectively applied to an enhancement layer reference picture as that applied to a lower layer reference picture used for decoding a block in a lower layer of the picture, wherein the block in the enhancement layer corresponds to the block in the lower layer, the enhancement layer reference picture corresponds to the lower layer reference picture, and the decoder selects the same weighting parameter from among an option of applying a different weighting parameter to the enhancement layer reference picture as that applied to the lower layer reference picture used for decoding the block in the lower layer and another option of applying the same weighting parameter.

13. A method for scalable video decoding comprising decoding a block in an enhancement layer of a picture by using a motion vector that corresponds to a block in a lower layer of the picture as a motion vector predictor for the block in the enhancement layer, selecting from among an option to use a same weighting parameter applied to a lower layer reference picture to decode the block in the lower layer for motion compensation of the block in the enhancement layer and another option to use a different weighting parameter, and using the same weighting parameter for motion compensation of the block in the enhancement layer when the option to use the same weighting parameter is selected, wherein the block in the enhancement layer corresponds to the block in the lower layer.

14. The method of claim 13, wherein said decoding step decodes the block in the enhancement layer by determining whether to use an explicit weighting parameter mode or an implicit weighting parameter mode.

15. The method of claim 13, wherein said decoding step comprises complying with a constraint imposed by a corresponding encoder that the same weighting parameter applied to the lower layer reference is always used for motion compensation of the block in the enhancement layer, when the motion vector corresponding to the block in the lower layer is used as the motion vector predictor for the block in the enhancement layer.

16. A method for scalable video decoding comprising decoding a block in an enhancement layer of a picture by receiving a rephrased weighted_pred_flag syntax and a rephrased weighted_bipred_idc syntax, the rephrased weighted_pred_flag syntax and the rephrased weighted_bipred_idc syntax set to 2 and 3, respectively, to indicate that a same weighting parameter is selectively applied to an enhancement layer reference picture as that applied to a lower layer reference picture used for decoding a block in a lower layer of the picture, wherein the block in the enhancement layer corresponds to the block in the lower layer, the enhancement layer reference picture corresponds to the lower layer reference picture, and the decoding step selects the same weighting parameter from among an option of applying a different weighting parameter to the enhancement layer reference picture as that applied to the lower layer reference picture used for decoding the block in the lower layer and another option of applying the same weighting parameter.

* * * * *